(12) United States Patent
Patapoutian et al.

(10) Patent No.: US 7,477,473 B2
(45) Date of Patent: Jan. 13, 2009

(54) SERVO POSITIONING ADJUSTMENT

(75) Inventors: Ara Patapoutian, Hopkinton, MA (US); Zoran Coric, Framingham, MA (US)

(73) Assignee: Maxtor Corporation, Scotts Valley, CA (US)

(*) Notice: Subject to any disclaimer, the term of this patent is extended or adjusted under 35 U.S.C. 154(b) by 8 days.

(21) Appl. No.: 11/655,799

(22) Filed: Jan. 18, 2007

(65) Prior Publication Data
US 2007/0165325 A1 Jul. 19, 2007

Related U.S. Application Data

(60) Provisional application No. 60/759,813, filed on Jan. 18, 2006.

(51) Int. Cl.
G11B 5/596 (2006.01)
G05B 11/01 (2006.01)

(52) U.S. Cl. .................. 360/77.04; 360/77.07; 318/560

(58) Field of Classification Search ................. None
See application file for complete search history.

(56) References Cited

U.S. PATENT DOCUMENTS

| | | | |
|---|---|---|---|
| 4,412,165 A | 10/1983 | Case et al. | |
| 4,679,103 A | 7/1987 | Workman | |
| 5,550,685 A * | 8/1996 | Drouin | 360/77.08 |
| 5,760,990 A | 6/1998 | Ukani et al. | |
| 5,774,297 A | 6/1998 | Hampshire et al. | |
| 5,835,300 A | 11/1998 | Murphy et al. | |
| 6,046,879 A | 4/2000 | Hampshire | |
| 6,061,200 A | 5/2000 | Shepherd et al. | |
| 6,115,203 A | 9/2000 | Ho et al. | |
| 6,141,175 A | 10/2000 | Nazariah et al. | |
| 6,192,283 B1 | 2/2001 | Holowko | |
| 6,549,362 B1 | 4/2003 | Melrose et al. | |
| 6,570,733 B1 | 5/2003 | Waugh et al. | |
| 6,587,291 B2 | 7/2003 | Patapoutian et al. | |
| 6,785,084 B2 | 8/2004 | Szita | |
| 6,965,491 B1 | 11/2005 | Perlmutter et al. | |
| 7,106,542 B1 | 9/2006 | Sun et al. | |
| 7,106,547 B1 | 9/2006 | Hargarten et al. | |
| 7,123,433 B1 | 10/2006 | Melrose et al. | |
| 7,161,759 B1 | 1/2007 | Zhang et al. | |
| 2007/0096678 A1* | 5/2007 | Melrose | 318/652 |

\* cited by examiner

*Primary Examiner*—Jason C Olson
(74) *Attorney, Agent, or Firm*—Fellers, Snider, et al.

(57) ABSTRACT

An apparatus and associated method for observing an analog position signal of a control object in relation to positional indicia, recalling a previously stored runout correction value associated with the positional indicia, and calculating a corrected position signal for the control object in relation to the position signal and the runout correction value.

20 Claims, 6 Drawing Sheets

SERVO POSITIONING ADJUSTMENT

RELATED APPLICATIONS

This application makes a claim of domestic priority under 35 U.S.C. § 119(e) to Provisional Patent Application No. 60/759,813.

BACKGROUND

The ongoing commercialization of data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), and the like.

A disc drive is one type of data storage device that generally stores data on one or more magnetic recording media. A corresponding array of data transducers are selectively moved across the surfaces of the media to transduce data therewith. Servo data patterns are often provided on the media to provide transducer positional feedback during such data input and output (I/O) operations.

With the continued demand for data processing devices with ever higher levels of performance, there remains a continual need for improvements in the manner in which servo control data are processed. It is to the furthering of those efforts that the embodiments of the present invention are directed.

SUMMARY OF THE INVENTION

Embodiments of the present invention are generally directed to an apparatus and associated method for observing an analog position signal of a control object in relation to positional indicia, recalling a previously stored runout correction value associated with the positional indicia, and calculating a corrected position signal for the control object in relation to the position signal and the runout correction value.

These and various other features and advantages which characterize the claimed embodiments will become apparent upon reading the following detailed description and upon reviewing the associated drawings.

DETAILED DESCRIPTION

Figure 1:
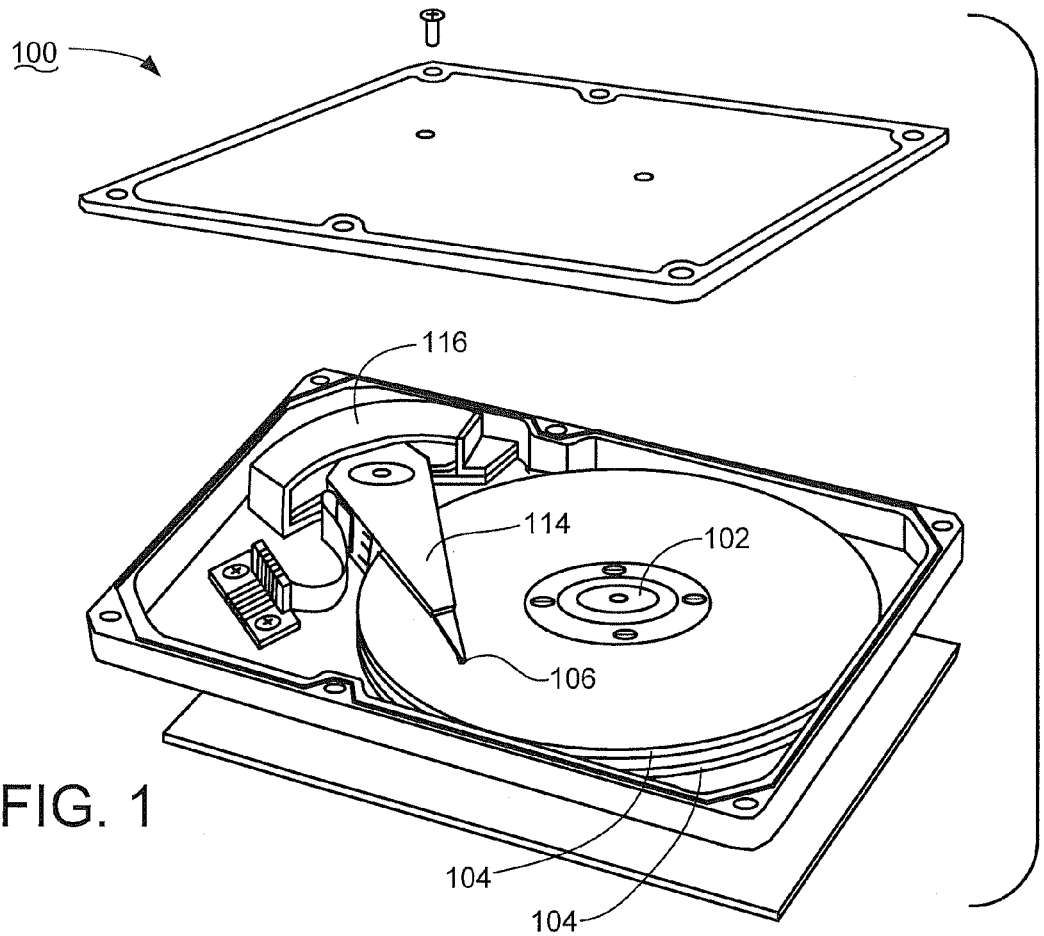
FIG. 1 depicts an isometric view of a data storage device suited for carrying out illustrative embodiments of the present invention.

FIG. 1 depicts an isometric view of a data storage device ("drive") 100. The drive 100 is provided to show an exemplary environment in which embodiments of the present invention can be advantageously practiced. It will be understood, however, that the present embodiments are not so limited.

The drive 100 includes a motor 102 that rotates one or more storage media 104. The media 104 are accessed by a corresponding array of transducers ("heads") 106. While FIG. 1 depicts the use of two discs and four corresponding heads 106, other numbers of discs and heads 106 as well as other types of media 104 can readily be utilized in the drive 100.

A head stack assembly ("HSA" or "actuator") 114 is rotatable via application of a controlled current to a voice coil motor (VCM) 116. Controlled operation of the VCM 116 causes the heads 106 to align with respect to storage tracks (discussed below) defined on the media 104 in order to store data thereto and retrieve data therefrom.

Figure 2:
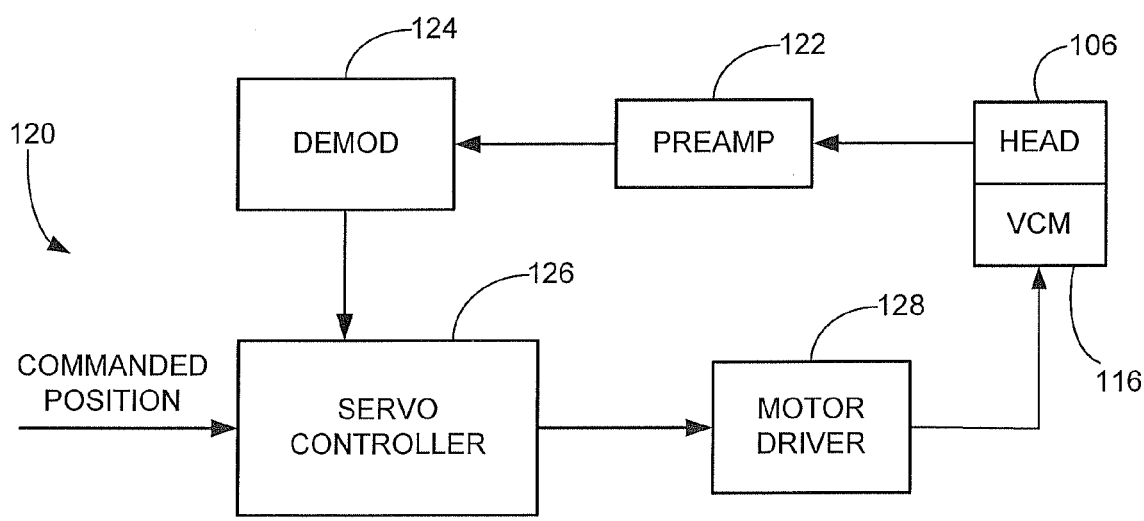
FIG. 2 depicts a functional block diagram of the servo circuit of the storage device of FIG. 1.

FIG. 2 depicts a generalized functional block diagram for a closed loop servo control circuit 120 of the drive 100. Preferably, embedded servo data are transduced from the media 104 by a corresponding head 106 and provided to a preamplifier/driver ("preamp") circuit 122. The preamp circuit 122 preamplifies and filters the read signals from the transducer 112, and provides the processed servo data to a demodulation ("demod") circuit 124. The demod circuit 124 operates to condition the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 106 with respect to the media 104. The servo controller 126 is preferably characterized as a programmable processor with associated servo code to direct the operation of the servo loop. The controller 126 generally operates in two primary modes, seeking and track following. Seeking generally involves controlled movement of the selected head 106 from an initial track to a destination track. Track following generally involves maintaining the selected head 106 at a commanded position with respect to the destination track in order to carry out data I/O operations with the destination track.

Figure 3:
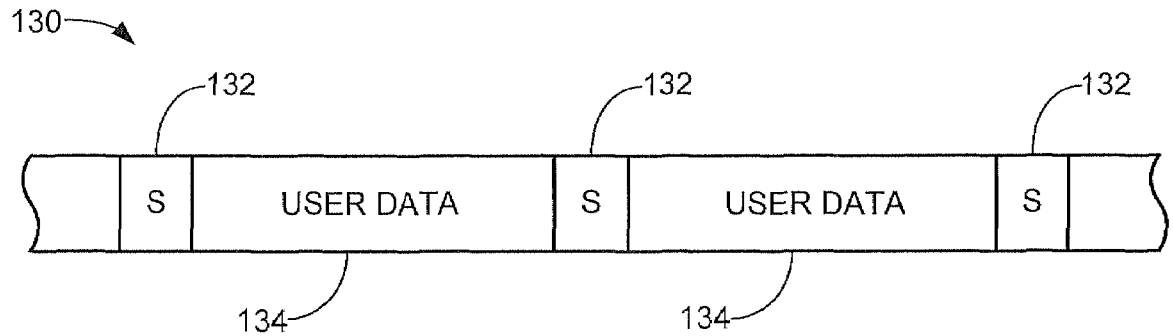
FIG. 3 depicts an illustrative arrangement for a data track of the storage device of FIG. 1.

FIG. 3 depicts a generalized representation of a preferred format for a selected track 130 of the media 104. Servo data in the form of servo ("S") fields 132 are embedded in spaced-apart relation about the circumference of the track 130. The servo data are preferably configured as servo wedges, which radically extend across the recording surfaces like spokes of a wheel. The servo data are preferably formed during device manufacturing. In some embodiments the writing of the servo data is performed by the use of a servo track writer ("STW") either to the media 104 before it is installed in the drive 100 ("ex-situ STW") or after the media is installed in the drive 100 ("in-situ STW"). In other embodiments seed data is written by a STW and then the drive 100 itself is programmed to perform self-servo writing procedures.

User data are stored in intervening regions 134 between adjacent servo fields 132. Addressable data sectors (not separately shown) are defined in the regions 134 during a device formatting operation to store predetermined amounts of user data.

Figure 4:
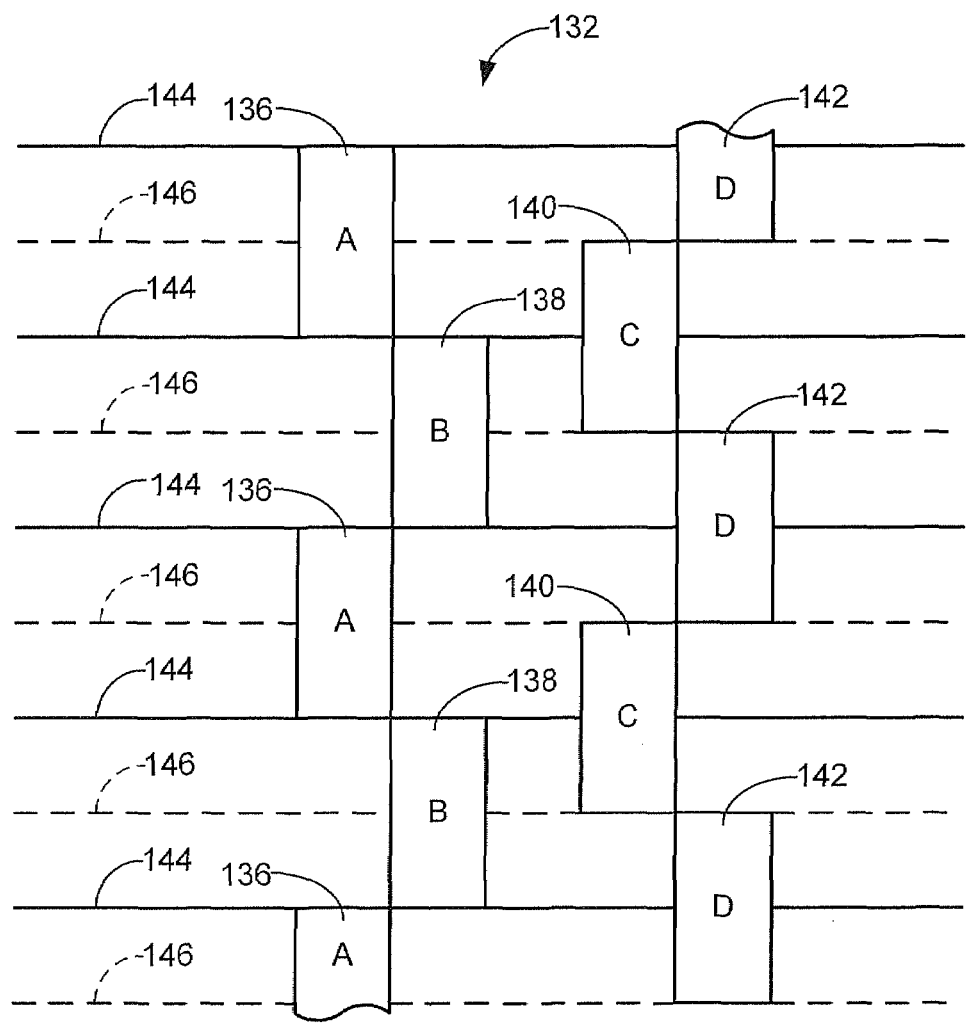
FIG. 4 depicts an illustrative arrangement of servo data in the form of quadrature dibit patterns.

FIG. 4 depicts a preferred arrangement of relevant portions of the servo data of FIG. 3 in the form of ABCD quadrature dibit patterns 136, 138, 140, 142. It will be understood that the arrangement of FIG. 4 is merely exemplary in nature and any number of other arrangements can readily be used in alternative equivalent embodiments of the present invention.

Generally, adjacent ones of the A and B patterns 136, 138 form AB seams 144 (shown in solid lines), and adjacent ones of the C and D patterns 140, 142 form CD seams 146 (shown in broken lines). The seams 144, 146 provide signal transition boundaries detectable by the servo circuit 120 which enable the circuit to assess the radial position of the head 106. For reference, the dibit servo pattern forming seams 144, 146 is an exemplary type of positional indicia for the control system, and it will be understood that other types and configurations of positional indicia can readily be used in alternative equivalent embodiments of the present invention. It will further be noted that although all seam boundaries at A and B patterns are collectively referred to as AB seams 144, half of these boundaries can equivalently be referred to as BA seams where the B pattern leads the A pattern. The same is true for CD seams 146 being alternatively referred to as DC seams 146.

Again, although for purposes of this description an in-phase burst pair (AB) and a quadrature burst pair (CD) are employed the present embodiments are not so limited. An enumeration of all possible servo patterns and uses thereof that are contemplated by the present embodiments is not necessary for the skilled artisan to readily understand the scope of the claimed subject matter, and hence no such enumeration is attempted.

Preferably, each of the patterns is a series of magnetic reversals of uniform length across the width of the pattern. In this way, a resulting transduced read signal obtained as a read sensor portion of the head 106 passes over the respective pattern will generally comprise an oscillating signal of selected frequency. The magnitude of the oscillating signal will generally be determined in relation to the radial position of the read sensor with respect to the pattern.

As the read sensor passes along a given AB seam 144, the magnitude (or signal power, etc.) of the A pattern read signal will generally be equal to the magnitude of the B pattern read signal. At other locations of the read sensor, the distance from an adjacent AB seam 144 can generally be correlated to the respective different magnitudes obtained for the A and B pattern read signals. The same is true for the C and D pattern read signals obtained as the read sensor proceeds to read the respective C and D patterns 140, 142 in the vicinity of the sensor trajectory.

The magnitudes of the respective A, B, C, and D read signals can be combined in any number of ways to provide an initial detected radial position of the head 106. For example, a data track such as track 130 can be provided with a centerline along a selected AB seam 144 and with boundaries along adjacent CD seams 146. That is, the width of such a track 130 is the distance from one CD seam 146 to the next CD seam 146. However, in alternative equivalent embodiments the data track locations and widths can be decoupled from the servo seams so that the radial widths of the tracks can be set to any desired width and location with respect to the associated servo data, including the use of overlapping data tracks.

It will be noted that the ABCD patterns are generally limited to providing an intra-track detected position. That is, processing the magnitudes of the ABCD read signals will generally give a distance indication from some selected point, such as a particular AB seam 144. Additional servo data such as in the form of Gray code provides inter-track positioning (addressing), so that as the transducer processes the servo data of a given servo field 132 (FIG. 3), an overall detected position of the transducer 112 with respect to the media 104 can be generated by the servo controller 126 (FIG. 2).

Figure 5:
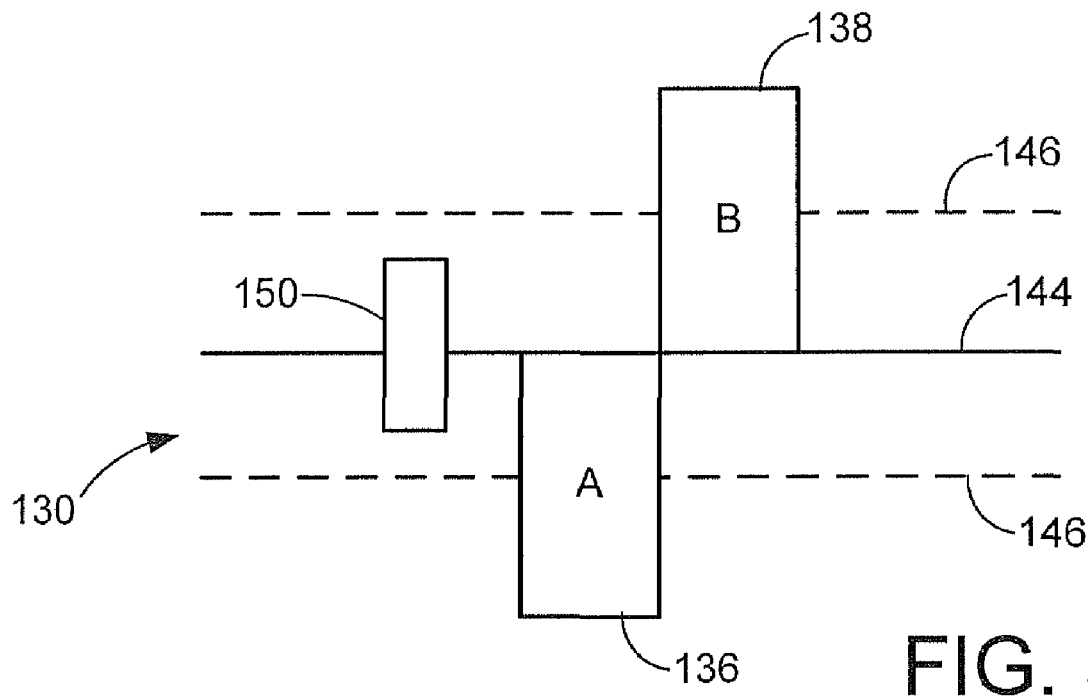
FIG. 5 is an enlarged detail of a portion of FIG. 4 depicting a read sensor traversing an AB burst in an centered condition.
Figure 6:
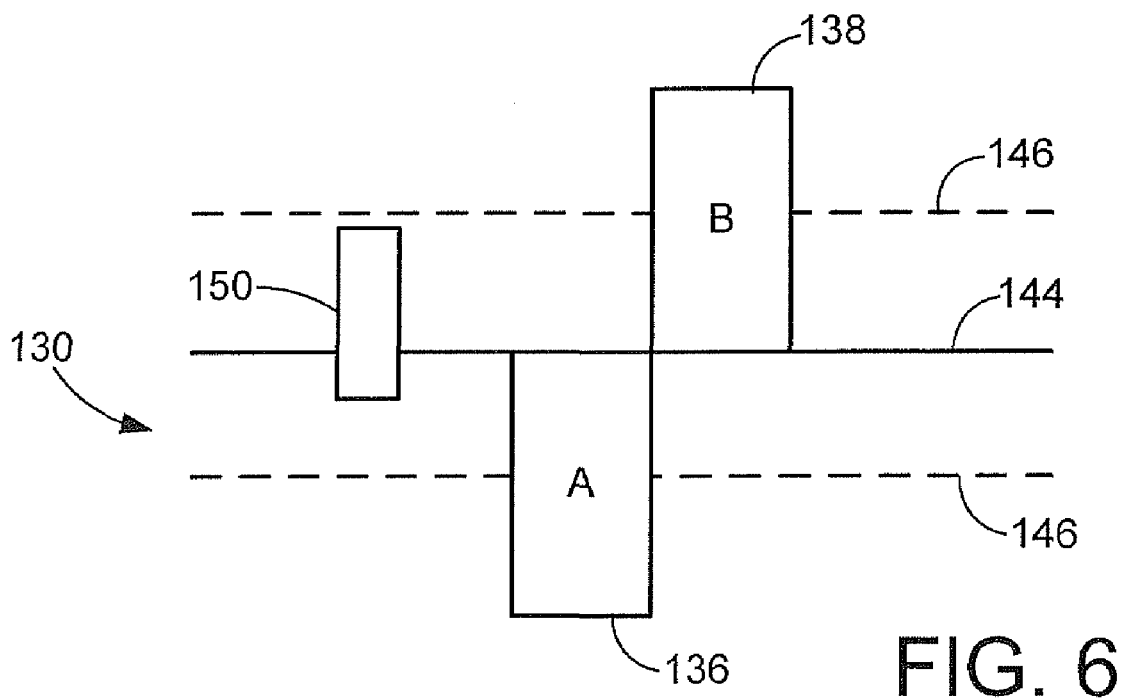
FIG. 6 is similar to FIG. 5 but depicting a non-centered condition resulting from a read sensor positional displacement.

FIG. 5 is an enlarged portion of the servo pattern of FIG. 4 depicting the ideal case during servoing where the read sensor 150 portion of the head 106 is centered around the AB seam 144 as it traverses the AB pattern. FIG. 6 contrarily depicts a non-centered condition due to a positional displacement of the read sensor 150 with respect to the AB seam 144. The positional displacement can be due to a nonrepeatable event such as an excitation, or it can be due to repeatable nonconcentricity of the track 130. Although not depicted in FIG. 6, it will be understood that a positional displacement of the read sensor 150 can also occur toward the A pattern 136 on the other side of the AB seam 144.

Figure 7:
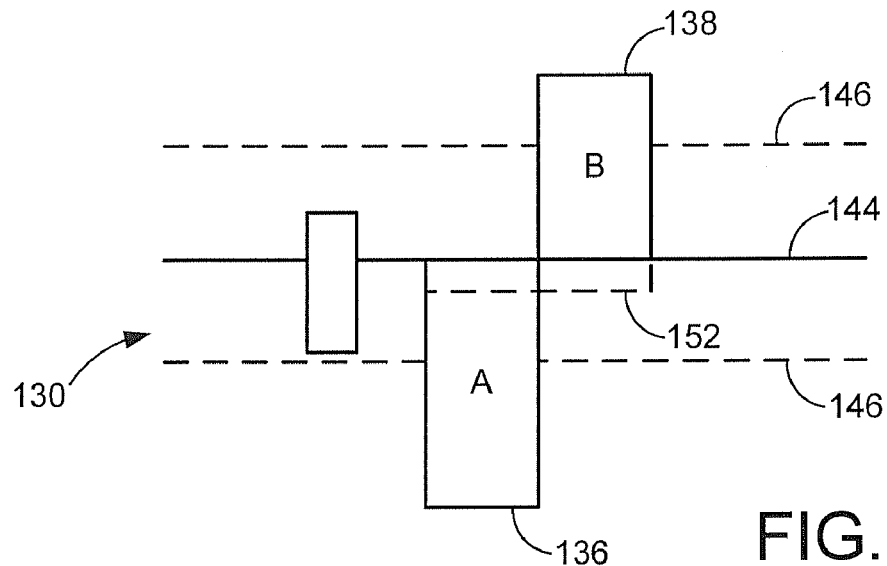
FIG. 7 is similar to FIG. 5 but depicting a non-centered condition resulting from an AB seam misplacement.

FIG. 7 likewise depicts a non-centered condition, but due to an AB seam 144 misplacement. The seam misplacement condition can result from an improper trimming of the previously written servo burst to define the AB seam 144, as opposed to the expected AB seam depicted at 152. Although not depicted in FIG. 7, it will be understood that a seam misplacement can also occur toward the other side of the expected AB seam 152, encroaching into the A pattern 136 rather than extending it as is shown in FIG. 7.

Figure 8:
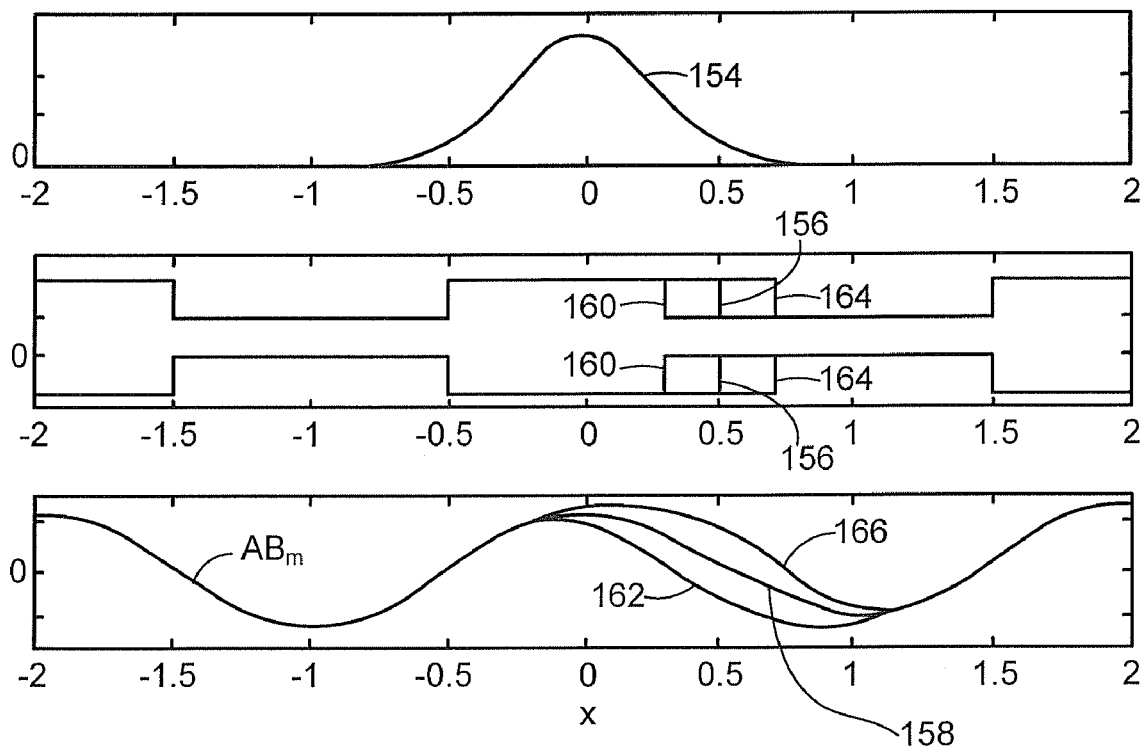
FIG. 8 diagrammatically depicts the effects of seam misplacement on the read sensor analog position signal.

The sensitivity of the read sensor 150 is substantially a Gaussian distribution about its centerline, as depicted by the distribution 154 in FIG. 8. Because of this, non-centered conditions of the read sensor 150 with respect to the AB seam 144 change the characteristics of the read signal transduced by the read sensor 150 while traversing the AB burst. For purposes of this description and meaning of the appended claims the transduced read signal is the difference signal (A burst−B burst) and referred to as the measured position $AB_m$, shown in FIG. 8 for two different seam misplacement conditions in comparison to a centered condition.

When the path of center of the read sensor 150 is aligned with the AB seam 144, as indicated by the AB seam placement denoted 156, the $AB_m$ signal denoted by reference number 158 is produced. The AB seam denoted 160 represents a seam misplacement of about 20% in one direction. This results in a non-centered condition as discussed above and alters the $AB_m$ signal to that denoted by reference 162. Conversely, the AB seam denoted 164 represents a seam misplacement of about 20% in the opposite direction, altering the $AB_m$ signal to that denoted by reference 166. As developed more below, the present embodiments leverage the altering affects that the non-centered conditions have on $AB_m$ to adjust the servo positioning in the presence of either seam misplacements or head displacements or both.

Figure 9:
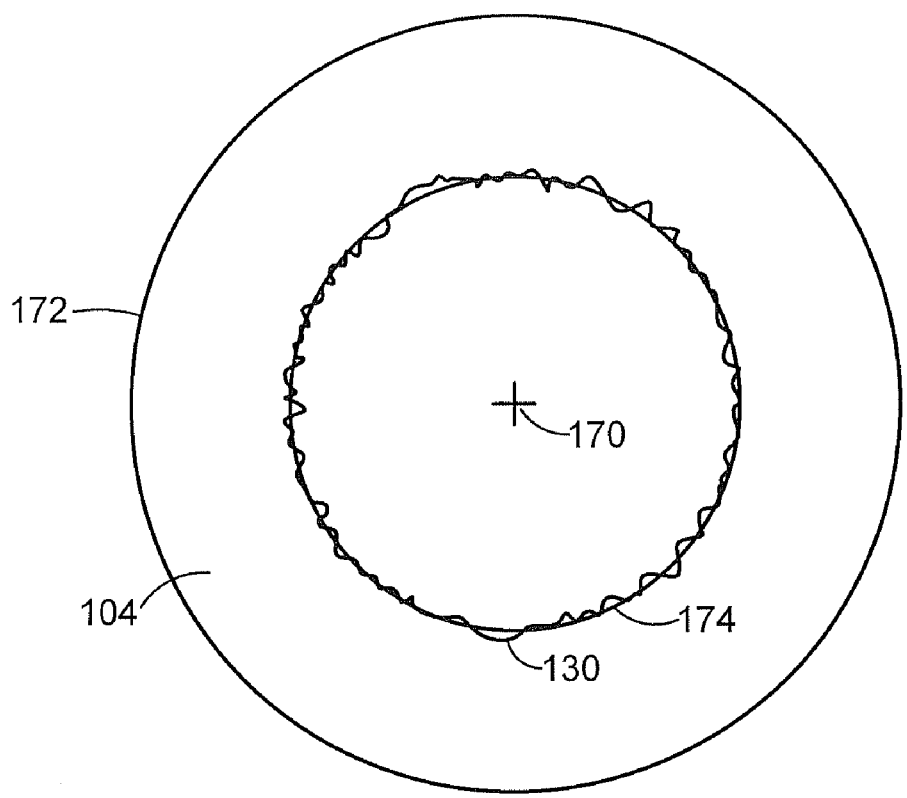
FIG. 9 depicts a perturbed storage track and an ideal track derived from the track by calculating embedded runout correction values with respect to the perturbations.

FIG. 9 diagrammatically depicts the media 104 which has a central axis of rotation 170 and an outer circumferential edge 172. Typically the media 104 has an inner circumferential edge as well, but it is not shown for simplicity sake. Also shown is the track 130, which is depicted as having a continuously perturbed path representing written in runout (WRO) caused by slight misplacements of the servo pattern seams during servo track writing. Also depicted is an ideal track 174 formed by a set of ideal seam placements that permit the head 106 to travel according to a smooth path that is substantially concentric with the axis 170. It will be noted that in some approaches the ideal track is intentionally offset with respect to the axis 170 to compensate for operably biasing the media 104 at its inner diameter to a supporting structure. It will be understood that FIG. 9 is not a scaled drawing, in that the depicted size of the tracks 130, 174 and the magnitude of the perturbations are merely illustrative for purposes of discussion.

The ideal track 174 can be derived in a number of ways, but generally correction factors are calculated and stored in memory for each of the servo burst sets in a track. Embedded runout correction ("ERC") values, for example, are presently used for discussion sake. Deriving the ERC values can be performed in varying ways, such as but not limited to that disclosed in U.S. Pat. No. 6,549,362 entitled Method and Apparatus for the Enhancement of Embedded Runout Correction in a Disk Drive, which is assigned to the assignee of the present application. In alternative equivalent embodiments burst pair correction ("BPC") schemes can be used, such as but not limited to that disclosed in copending application Ser. No. 10/778,001 entitled Data Tracking Method and Apparatus for Disk-Based Data Storage, which is assigned to the assignee of the present application. In other alternative equivalent embodiments other types of correction factors can be employed, such as but not limited to burst correction values ("BCV"), repeatable runout ("RRO") schemes, and zero acceleration path ("ZAP") schemes. For purposes of the present description and meaning of the appended claims the stored correction value is referred to as "C."

Figure 10:
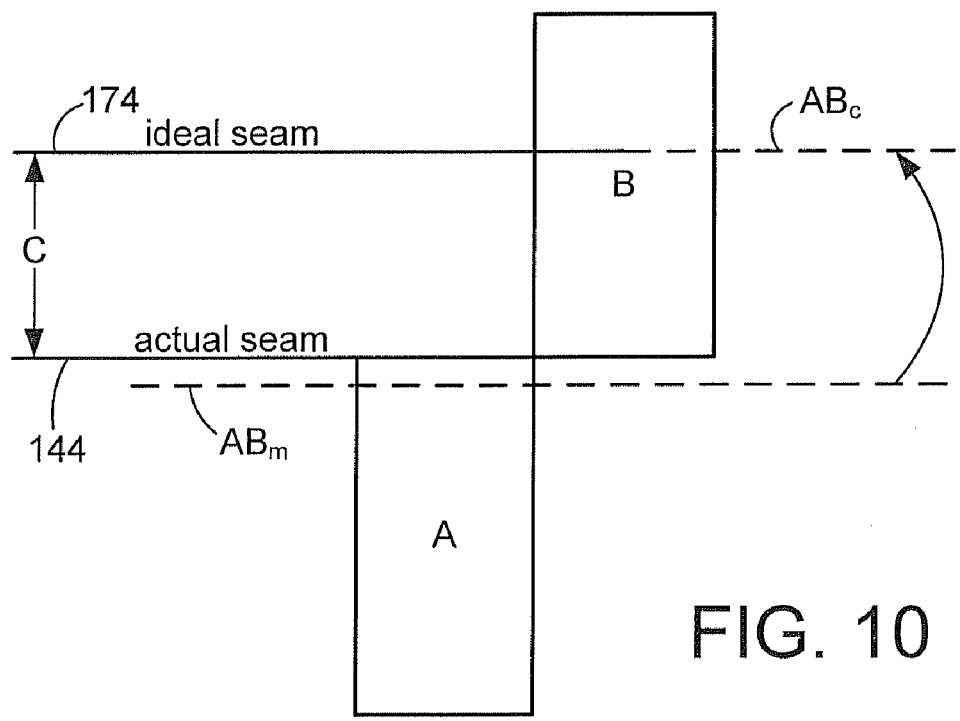
FIG. 10 is similar to FIG. 5 but depicting the corrected position signal that is calculated as a function of the observed position signal and the stored runout correction value.

FIG. 10 diagrammatically depicts the path of the read sensor 150 as it transduces the analog position signal $AB_m$ while traversing the AB servo burst, indicating a positional displacement with the AB seam as discussed above. The present embodiments contemplate an apparatus and associated method for calculating a corrected position signal $AB_c$ that corresponds to a read sensor 150 path that aligns with the ideal track 174. $AB_c$ is calculated in relation to the observed $AB_m$ signal and the corresponding stored C value. Advantageously, both $AB_m$ and $AB_c$ are analog signals, so that the adjustments made by the present embodiments occur before demodulation of the transduced read signal by the demod 124 (FIG. 2) portion of the servo circuit 120. The resulting $AB_c$ signal can then be demodulated to produce a position error signal for use by the servo controller 126 (FIG. 2) portion of the servo circuit to move the read sensor 150 into alignment with the ideal seam 174.

Generally, the present embodiments contemplate deriving a nonlinear functional relationship for $AB_c$ by performing an analytical regression of a nonlinear function in terms of $AB_m$ and C. In general terms, the functional relationship affords the computational opportunity to scale the stored C value in relation to an observed offtrack head 106 position. During reduction to practice of the present embodiments it was determined that a useful nonlinear function can be defined by the relationship:

$$AB_c = \alpha_1 AB_m + \alpha_2 C + \alpha_3 C|AB_m - \alpha_4 C|$$

During the reduction to practice a head 106 having a 55% reader width to track width was used. By employing a minimum squares regression analysis for each of incremental 1% offsets between write fault gates of ±17% offsets, and for each servo sector in a particular track, optimal results were obtained with the following coefficient set:

$$[\alpha_1, \alpha_2, \alpha_3, \alpha_4] = [1.03, -1.1, 0.7, 0.6]$$

Accordingly, a functional relationship for $AB_c$ is preferably derived and stored in memory. The derivation is subsequently used to calculate $AB_c$ by inputting $AB_m$ and C. An $AB_c$ derivation can be performed uniquely for each track, or it can be derived in terms of a regression covering more than one track. The $AB_c$ derivation can also be performed respective to each head 106, or it can be derived in terms of a regression covering more than one head 106.

Furthermore, to maximize the servo tracking capability where a quadrature servo pattern is employed, a $CD_c$ can be derived in terms of a $CD_m$ and C in the same manner as discussed above. During experimentation it was observed that employing the $AB_c$ and $CD_c$ derivations above was capable of reducing the observed repeatable runout to less than 1.2% of track width in the presence of servo misplacements varying up to 15% of track width.

In other trials seeking even more scrutiny in the derivation, the following nonlinear functional relationship of $AB_c$ in terms of $AB_m$ and C was found useful:

$$AB_c = a0\left(\frac{AB_m}{S}\right)^4 + a1\left(\frac{AB_m}{S}\right)^3 + a2\left(\frac{AB_m}{S}\right)^2 + a3\left(\frac{AB_m}{S}\right) + a4$$

where:
S=scaling factor (such as 1024 counts between adjacent AB seams) and where the coefficients are second order functions of C:
a0=b00C²+b10C+b20
a1=b01C²+b11C+b21
a2=b02C²+b12C+b22
a3=b03C²+b13C+b23
a4=b04C²+b14C+b24

Figure 11:
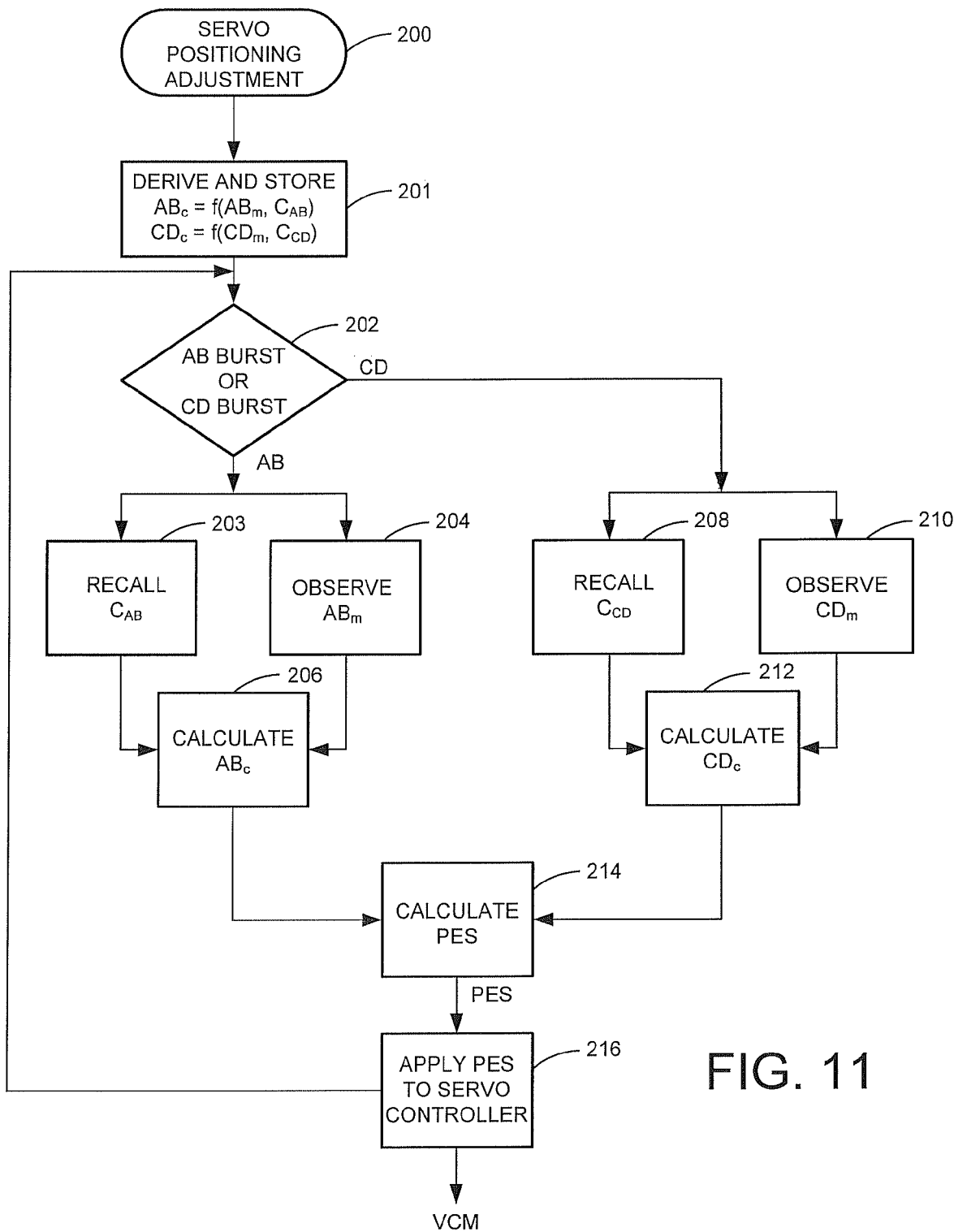
FIG. 11 is a flowchart depicting steps in a method for SERVO POSITIONING ADJUSTMENT in accordance with embodiments of the present invention.

FIG. 11 is a flowchart illustrating steps in a method 200 for SERVO POSITIONING ADJUSTMENT performed by the servo circuit 120 by executing computer instructions stored in memory in accordance with embodiments of the present invention. The method 200 begins in block 201 by deriving functional relationships for $AB_c$ in terms of $AB_m$ and C. Where applicable, a functional relationship for $CD_c$ is likewise derived in terms of $CD_m$ and C. The derivation(s) are then stored in memory.

The method 200 continues to block 202 where it is determined whether the read sensor 150 is traversing an AB burst or a CD burst. If the determination of block 202 is an AB burst, then control passes to blocks 203 and 204 in simultaneously recalling the correction factor associated with the AB burst, $C_{AB}$, in block 203 while observing the head 106 position signal $AB_m$ in block 204. From these two inputs, in block 206 $AB_c$ is calculated from the previously derived functional relationship that is recalled from memory.

If the determination of block 202 is a CD burst, then control passes to blocks 208 and 210 in simultaneously recalling the correction factor associated with the CD burst, $C_{CD}$, in block 208 while observing the head 106 position signal $CD_m$ in block 210. From these two inputs, in block 212 $CD_c$ is calculated from the previously derived functional relationship that is recalled from memory.

The corrected position signal $AB_c$ or $CD_c$ is then demodulated in order to calculate a position error signal in block 214. The position error signal is then used to send a corrective current to the VCM 116 (FIG. 2) to reposition it in block 216.

Generally, the present embodiments contemplate an apparatus having a control object (such as the head 106) and means for positioning the control object in response to an observed position of the control object with respect to positional indicia and a previously stored runout correction value associated with the positional indicia. For purposes of the present description and meaning of the appended claims, the term "means for positioning" corresponds to the servo circuit 120 which is capable of performing the method of FIG. 11 to derive a functional relationship for the corrective position signal, and then calculate the analog corrected position signal $AB_c$ in terms of an analog observed position signal $AB_m$ and C. The term "means for positioning" expressly does not include previously attempted solutions whereby the analog observed position signal ABm is first demodulated in order to calculate a corresponding digital position error signal, and then applying corrective positioning measures in relation to the position error signal. The "means for positioning" also does not include previously attempted solutions that utilize stored correction values in a lookup table.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to measuring positional aspects of a moving media data storage device, it will be appreciated by those skilled in the art that the claimed subject matter is not so limited and various other systems can utilize the present embodiments without departing from the spirit and scope of the claimed invention.

What is claimed is:

1. A method comprising observing an analog position signal of a control object in relation to positional indicia, recalling a previously stored runout correction value associated with the positional indicia, and calculating a corrected position signal for the control object in relation to an analytical regression in terms of the analog position signal and the runout correction value.

2. The method of claim 1 wherein the corrected position signal is an analog signal.

3. The method of claim 2 further comprising demodulating the corrected position signal to obtain a position error signal and moving the control object in relation to the position error signal.

4. The method of claim 3 wherein the positional indicia are characterized by servo dibit patterns on a storage medium.

5. The method of claim 4 wherein the control object is characterized as a transducer of a data storage device and the corrected position signal is in relation to an ideal position of the transducer with respect to a data track of the storage medium.

6. The method of claim 5 performed by executing computer instructions that are stored in memory.

7. The method of claim 1 wherein the calculating step is characterized by the analytical regression being a nonlinear function.

8. The method of claim 7 wherein the nonlinear function is characterized by the relationship:

$$AB_{cor} = \alpha_1 AB_m + \alpha_2 C + \alpha_3 C |AB_m - \alpha_4 C|$$

where:
$AB_{cor}$ is the corrected position signal
$AB_m$ is the observed position signal
C is the runout correction value $\alpha 1, \alpha 2, \alpha 3, \alpha 4$ are coefficients derived by the analytical regression.

9. The method of claim 7 wherein the nonlinear function is characterized by the relationship:

$$AB_{cor} = a0\left(\frac{AB_m}{S}\right)^4 + a1\left(\frac{AB_m}{S}\right)^3 + a2\left(\frac{AB_m}{S}\right)^2 + a3\left(\frac{AB_m}{S}\right) + a4$$

where:
$AB_{cor}$ is the corrected position signal
$AB_m$ is the observed position signal
S is the scaling factor (increments)
$a0 = b00C^2 + b10C + b20$
$a1 = b01C^2 + b11C + b21$
$a2 = b02C^2 + b12C + b22$
$a3 = b03C^2 + b13C + b23$
$a4 = b04C^2 + b14C + b24$
bxx are coefficients derived by the analytical regression
C is the runout correction value.

10. An apparatus comprising:
a control object; and
a servo circuit configured to position the control object in response to a corrected position signal that is generated in relation to an analytical regression in terms of an analog position signal of the control object in relation to positional indicia and a runout correction value associated with the positional indicia.

11. The apparatus of claim 10 wherein the corrected position signal is an analog signal.

12. The apparatus of claim 11 wherein the servo circuit comprises a demodulator that configures the corrected position signal as a position error signal.

13. The apparatus of claim 12 wherein the servo circuit comprises a servo controller that moves the control object in relation to the position error signal.

14. The apparatus of claim 13 wherein the positional indicia are characterized by servo dibit patterns on a storage medium.

15. The apparatus of claim 14 wherein the control object is characterized as a transducer of a data storage device and the corrected position signal is in relation to an ideal position of the transducer with respect to a data track of the storage medium.

16. The apparatus of claim 15 comprising computer instructions that are stored in memory and executed to control operations of the servo circuit.

17. The apparatus of claim 10 wherein the analytical regression is characterized by a nonlinear function.

18. The apparatus of claim 17 wherein the nonlinear function is characterized by the relationship:

$$AB_{cor} = \alpha_1 AB_m + \alpha_2 C + \alpha_3 C |AB_m - \alpha_4 C|$$

where:
$AB_{cor}$ is the corrected position signal
$AB_m$ is the observed position signal
C is the runout correction value
$\alpha 1, \alpha 2, \alpha 3, \alpha 4$ are coefficients derived by the analytical regression.

19. The method of claim 17 wherein the nonlinear function is characterized by the relationship:

$$AB_{cor} = a0\left(\frac{AB_m}{S}\right)^4 + a1\left(\frac{AB_m}{S}\right)^3 + a2\left(\frac{AB_m}{S}\right)^2 + a3\left(\frac{AB_m}{S}\right) + a4$$

where:
$AB_{cor}$ is the corrected position signal
$AB_m$ is the observed position signal
S is the scaling factor (increments)
a0=b00$C^2$+b10C+b20
a1=b01$C^2$+b11C+b21
a2=b02$C^2$+b12C+b22
a3=b03$C^2$+b13C+b23
a4=b04$C^2$+b14C+b24
bxx are coefficients derived by the analytical regression
C is the runout correction value.

20. An apparatus comprising:
a control object; and
means for positioning the control object in response to an analytical regression of an observed position of the control object with respect to positional indicia and a previously stored runout correction value associated with the positional indicia.

* * * * *